Patented July 21, 1942

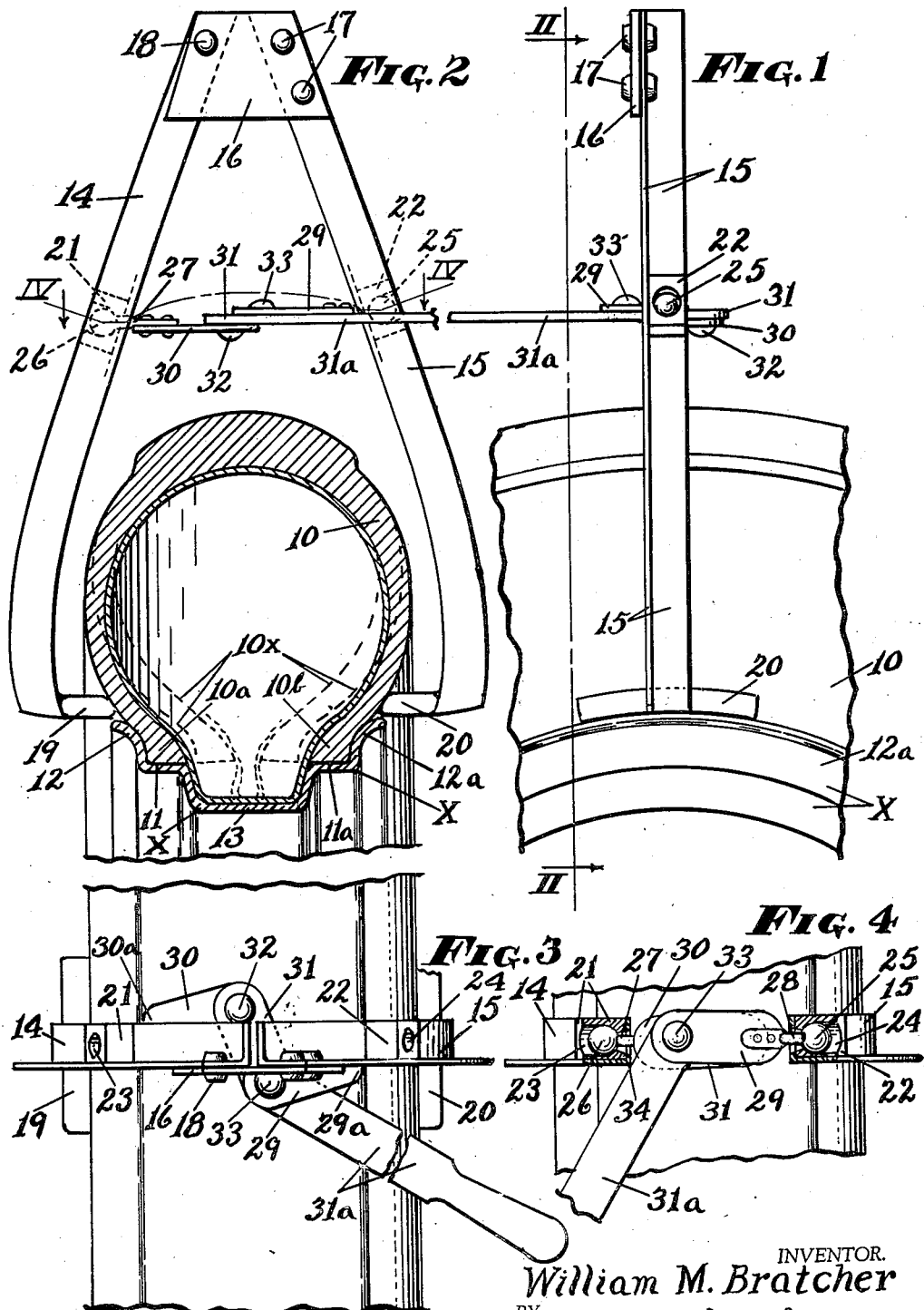

2,290,155

UNITED STATES PATENT OFFICE 2,290,155

TIRE TOOL

William M. Bratcher, Protection, Kans.

Application March 18, 1939, Serial No. 262,672

2 Claims. (Cl. 157—6)

My invention relates to an improvement in tire tools. It is well known among those familiar with the job of removing tires from rims that if the tire has been on the rim for some time, the bead of the tire will adhere, or become stuck to the rim or flange thereof and it is a difficult job to tear the tire loose from the rim so as to remove the tire from the rim. This is particularly true with large tires such as are used on tractors and the like. These tires and the rims or wheel on which they are mounted are often so heavy that it is all one man can do to lift the tire and rim or wheel, and some times one man cannot even do that. In view of this difficulty it is obvious that the job of changing tires becomes more complicated when the tire sticks to the rim or wheel. The type of rim usually employed for tires of the kind mentioned is a channel type rim having a bearing plate portion on each side of the channel on which the bead of the tire rests, and at the outer edges of the bearing plate is an upwardly extending and outwardly curving flange which serves to retain the tire on the rim. It is this flange and bearing plate to which the tire becomes stuck. Now to remove the tire from the rim the beads of the tire must be pulled loose from the flanges and bearing plates and the side walls of the tire and the beads thereon be moved toward each other to such a position that the beads of the tire will fall into the channel of the rim and thereby drop the bottom of the tire to such a point that the bottom side of the tire can be pulled sideways off of the rim whereupon the balance of the tire will readily slip from the rim.

In view of the difficulty encountered in tearing the bead of the tire loose from the rim I have provided my invention which comprises a tong like tool, the object of which is to engage the side walls of the tire just above the bead and apply pressure on the tire at this point so as to tear the beads of the tire loose from the rim and move them toward each other as above described so that the tire may be removed from the rim.

Now referring to the accompanying drawing, Fig. 1 is a side view of a portion of a tire and rim and showing my improved tire tool in working position.

Fig. 2 is a detail cross sectional view through the tire and rim and illustrating how the tire tool is applied to the tire. The view is taken along the line II—II in Fig. 1.

Fig. 3 is a plan view of the tire and tool as shown in Fig. 2.

Fig. 4 is a detail sectional view through the tire tool. The view is taken along the line IV—IV in Fig. 2 and shows the tool in its collapsed position instead of being open as it is in Fig. 2.

In the drawings is shown a tire 10, the beads 10a and 10b of which are mounted on the bearing plates 11 and 11a and between the flanges 12 and 12a which are positioned on either side of the channel portion 13 of the rim X as will readily be understood.

The tire tool comprises a tong like tool having a pair of tong elements 14 and 15 that are made preferably of angle irons that are curved slightly toward each other at their lower portion as shown in Fig. 2. At 16 is a plate element that is rigidly attached either by being welded or riveted as shown at 17 to the upper end of the tong element 15, and at 18 is a rivet that passes through the plate 16 and the upper end of the tong element 14 so as to make a pivotal mounting of the tong element 14 on the plate 16 at the point 18.

At 19 and 20 is shown presser elements that are rigidly attached, preferably by being welded, to the lower end of their respective tong elements 14 and 15. Attention is called to the fact that these presser elements 19 and 20 are of considerable length and are curved, as shown in Fig. 1, to correspond somewhat to the curvature of the tire 10 and rim X, so as to provide a broad area of contact of the presser elements 19 and 20 on the tire 10 at a point adjacent the flanges 12 and 12a of the rim X.

Intermediate the ends of the tong elements 14 and 15 is a pair of blocks 21 and 22 that are rigidly attached, preferably by being welded to their respective tong elements 14 and 15. The blocks 21 and 22 are positioned in the angle of the angle iron tong elements 14 and 15 so as to provide a solid and substantial bearing for the blocks 21 and 22. The blocks 21 and 22 are provided with ball sockets 23 and 24 in which are positioned balls 25 and 26 that are provided with legs 27 and 28 that are rigidly attached to their respective balls 25 and 26. The legs 27 and 28 pass through a hole in the blocks 21 and 22, and also through registering holes in the legs of the angle iron tong elements 14 and 15.

At 29 and 30 is a pair of link elements. The outer end of the leg 28 is flattened and is rigidly attached, either by being welded or riveted, to one end of the link element 29. Similarly, the outer end of the leg 27 is flattened and is rigidly attached, either by being welded or riveted, to one end of the link 30. At 31 is a toggle element to which the outer end of the link 30 is pivotally attached at the point 32, and to which the outer end of link element 29 is pivotally attached at the point 33. The toggle element 31 is provided with a long handle element 31a that is an integral part of the toggle element 31. This arrangement provides a toggle operating means for the tongs 14 and 15, and this operating means is revolvable about an axis passing through the center of the balls 25 and 26.

The operation of the tool is as follows: The handle 31a is swung to the right whereupon the toggle element pushes the link elements 29 and 30 outwardly in opposite directions whereupon the inner ends 29a and 30a will engage their respective tong elements 14 and 15 and push them apart. This being done the tong ends and presser elements may be slipped over the tire and so positioned that the presser elements will rest against the side walls of the tire just along the beads of the tire and above the flanges of the rim. Now by swinging the handle element 31a to the left, the toggle element 31 will pull on the link elements 29 and 30 in such a manner that the lower ends of the tong elements 14 and 15 will be pulled toward each other, therefore the presser elements 19 and 20 will tear the beads of the tire loose from the rim and push the beads of the tire toward each other to a position indicated by the dotted lines 10x.

When the tire has been pushed together as indicated by the dotted lines 10x, the handle element 31a has been swung to the left to its extreme position as shown in Fig. 4, which movement has caused the toggle element 31 to swing the points 32 and 33 slightly past a line drawn through the center of the balls 25 and 26, and the handle element 31a will rest against the tong element 14 at the point 34. The tool set in the position just described is in a locked position such that the tire pressing against the presser elements 19 and 20 cannot spread the tong elements 14 and 15 apart, therefore the tire is held in such a position that the beads of the tire will drop into the channel portion 13 of the rim, whereupon the tire may be removed as previously described.

New tires, especially the large size tires, are usually very stiff and it is difficult to push the beads of the tire together sufficiently that they will drop into the channel 13 so that the tire may be mounted on the rim. In view of this fact, my improved tire tool is quite useful in collapsing new tires in the process of mounting the tire on the rim.

There are many machines that use pneumatic tires and the machine may have fenders. or structural members of the machine that are positioned close to the tire so that it may be difficult to operate the toggle handle 31a unless its position can be adjusted and still operate the tong elements 14 and 15. This adjustment is accomplished by revolving the toggle mechanism about the axis passing through the center of the balls 25 and 26 to a point where the handle 31a can be easily swung to operate the tongs 14 and 15 as previously described.

Such modifications of my invention may be employed as lie within the scope of the claims without departing from the spirit and intention of my invention. Now having fully described my invention, I claim:

1. In a tire tool of the kind described; said tool comprising in combination a pair of tong like elements that are pivotally joined together at one end, and a toggle mechanism joining between said tong elements for spreading and closing the free ends of said tongs, and means for revolving the toggle mechanism about an axis between the points of connection of the toggle mechanism to the tong element and so that the toggle mechanism may be set at any selected angle with respect to the tong elements and still function to spread and close the tong elements.

2. In a tire tool of the kind described; said tool comprising in combination a pair of tong like elements that are pivotally joined together at one end, and a toggle mechanism joining between said tong elements for spreading and closing the free ends of said tongs, and means for adjusting the toggle mechanism to operate at selected angles with respect to the tong elements and about an axis between the points of connection of the toggle mechanism to the tong elements and means in said toggle mechanism for locking the said tongs in a closed position while the toggle mechanism is in any of its aforesaid adjusted angular positions about the axis between the points where the toggle mechanism joins the said tong elements.

WILLIAM M. BRATCHER.